United States Patent
Keough

(10) Patent No.: US 8,822,008 B2
(45) Date of Patent: Sep. 2, 2014

(54) REPLACEABLE WEAR LINER

(75) Inventor: Terry Keough, Rock Creek (CA)

(73) Assignee: ACR Group Inc. (CA)

( * ) Notice: Subject to any disclaimer, the term of this patent is extended or adjusted under 35 U.S.C. 154(b) by 677 days.

(21) Appl. No.: 12/820,451

(22) Filed: Jun. 22, 2010

(65) Prior Publication Data

US 2011/0244163 A1    Oct. 6, 2011

(51) Int. Cl.
| | |
|---|---|
| B32B 3/06 | (2006.01) |
| B32B 3/08 | (2006.01) |
| B32B 3/18 | (2006.01) |
| B32B 27/00 | (2006.01) |
| B32B 33/00 | (2006.01) |
| B01F 15/00 | (2006.01) |
| B29C 39/10 | (2006.01) |

(52) U.S. Cl.
CPC ........... B29C 39/10 (2013.01); B01F 15/00837 (2013.01); *Y10S 428/90* (2013.01)
USPC ................... 428/99; 428/48; 428/72; 428/76; 428/692.1; 428/900; 193/2 R; 198/823

(58) Field of Classification Search
USPC .......... 428/99, 692, 900, 48, 72, 76; 193/2 R; 198/823
See application file for complete search history.

(56) References Cited

U.S. PATENT DOCUMENTS

| | | | | |
|---|---|---|---|---|
| 3,665,355 | A | * | 5/1972 | Sasaki et al. ................... 335/306 |
| 5,016,775 | A | * | 5/1991 | Budenbender ................ 220/288 |
| 6,129,967 | A | | 10/2000 | Young et al. .................... 428/49 |
| 6,303,241 | B1 | * | 10/2001 | Miles ............................ 428/812 |
| 7,187,261 | B2 | * | 3/2007 | Cassar .......................... 335/306 |
| 2011/0151177 | A1 | | 6/2011 | Stackpole ........................ 428/99 |
| 2011/0151178 | A1 | | 6/2011 | Stackpole ........................ 428/99 |

FOREIGN PATENT DOCUMENTS

CA    2 352 341    6/2000

OTHER PUBLICATIONS

Office Action dated May 7, 2012 issued in corresponding Canadian Patent Application No. 2,708,325.
Office Action dated Nov. 7, 2011 issued in corresponding Canadian Patent Application No. 2,708,325.
Office Action dated May 7, 2011 issued in corresponding Canadian Patent Application No. 2,708,325.

* cited by examiner

*Primary Examiner* — Maria Veronica Ewald
*Assistant Examiner* — Joanna Pleszczynska
(74) *Attorney, Agent, or Firm* — Ostrolenk Faber LLP

(57) ABSTRACT

A replaceable wear liner pad assembly can be used to provide an array of tiles for lining a trough structure, the trough structure being made of a magnetically attractive material. The replaceable wear liner assembly includes magnetic members encapsulated within a resilient polymeric material, the polymeric material being transparent to magnetic fields. The polymeric material may have the general consistency of truck tire rubber. One side of the tile has a sheet or portion of a set gauge thickness such that in use the magnetic members are maintained at a set standoff distance from the underlying trough structure. The resilient material is far more flexible than the magnetic elements, such that the assembly can flex somewhat. The pad assembly is free of mechanical fasteners. Individual elements of the tile array may be replaced when worn, rather than the entire array. The underside of the pad assembly may provide a seal against the underlying trough structure to discourage leakage at the apertures formerly used for conventional wear liner stud assemblies.

42 Claims, 6 Drawing Sheets

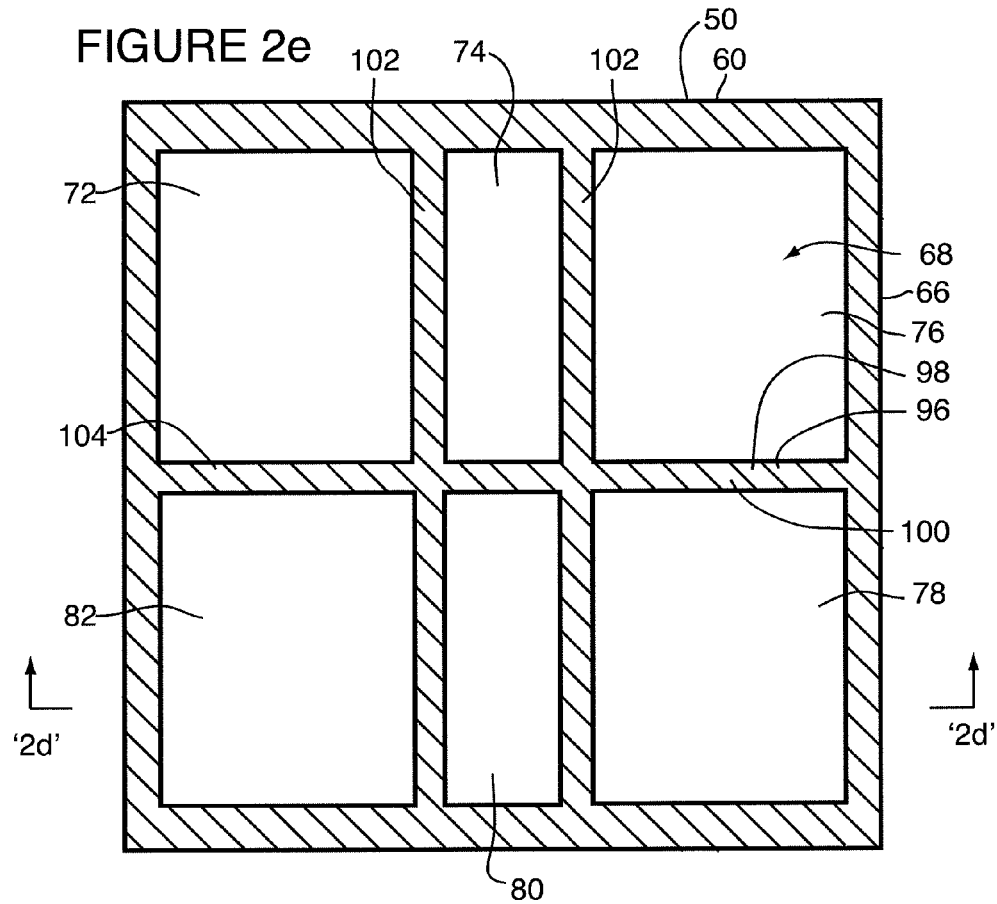
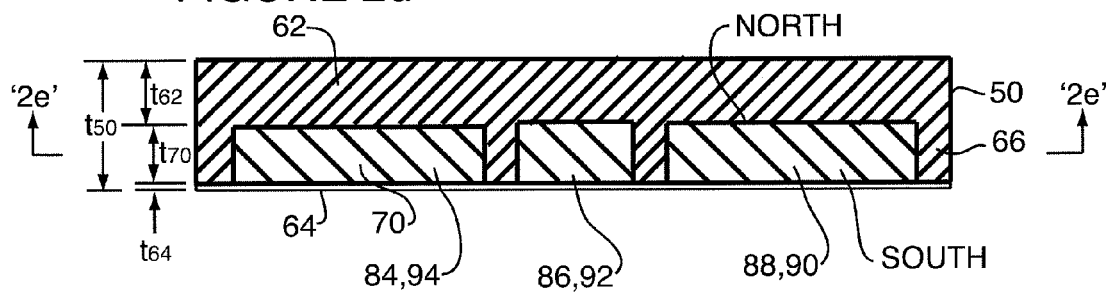

REPLACEABLE WEAR LINER

FIELD OF THE INVENTION

This invention relates to the field of wear liners, and in particular to replaceable wear liners.

BACKGROUND OF THE INVENTION

Many industrial processes involve the transport of a workflow material feedstock along a channel or trough. The workflow material may often be abrasive. A traditional approach is to provide the trough with a liner, whether along a bottom portion thereof of along side portions as well as a bottom portion. In the past replaceable sacrificial wear liners, most typically steel wear liners, have been used. Very often these wear liners have been held in place by mechanical fasteners, such as threaded fasteners, often welded threaded rod studs, that protrude downwardly through the chute structure, and that are fastened from the outsides.

SUMMARY OF THE INVENTION

In an aspect of the invention there is a a wear member. It has a body having at least a first accommodation defined therein. The body has a width, a breadth and a thickness. Each of the width and breadth is greater in magnitude than the thickness. There is at least a first magnetic member, the first magnetic member being seated in the first accommodation. The body has a first portion, a second portion, and a peripheral wall. The first portion is made of a first material. The first portion extends predominantly width-wise and breadth-wise, and overlies the first magnetic member. The second portion underlies the first magnetic member. The peripheral wall extends about the magnetic member. The first material is a non-magnetizable, non-brittle, consumable wear material. The first material has a first modulus of elasticity. The magnetic material has a modulus of elasticity. The first modulus of elasticity of the first material is at least an order of magnitude smaller than the modulus of elasticity of the first magnetic member. The second portion is magnetically transparent. The body defines a footprint of the wear member for seating on a magnetically attractive substrate. When in use the second portion extends between the first magnetic material and the magnetically attractive substrate.

In a feature of that aspect of the invention the second portion established a stand-off distance between the first magnetic member and the underlying magnetically attractive substrate. In another feature, the first portion is substantially thicker than the second portion, and the second portion is substantially thinner than the first magnetic member. In another feature, the first portion, the second portion and the first magnetic member, taken together, have an overall thickness, and at least one of: (a) the first portion overlying said first magnetic member is at least five times as thick as the second portion underlying said magnetic member; (b) the first portion is at least one third as thick as the overall thickness; (c) the second portion underlying said first magnetic member is less than 1/20 as thick as the overall thickness; and (d) each of the length and the breadth is more than 3 times as great as the overall thickness. In still another feature, the wear member is one in which at least one of (a) the first portion is made of a polymeric material; (b) the second portion is made of a polymeric material; and (c) the first and second portions, are made of the same polymeric material.

In still another feature, the first magnetic member and any additional magnetic members are encapsulated within the body. In another feature, the first portion, the second portion, and the peripheral wall form a unified assembly that is one of (a) a monolithic polymer based casting; (b) a vulcanized rubber-based member; (c) an assembly of permanently fused polymeric members encapsulating the first magnetic member and any other magnetic member thereof. In still another feature, any one of: (a) the second portion is made of a flexible polymeric material that defines, in use, a seal against the magnetically attractive substrate; and (b) the second portion has a compressible seal member mounted thereto, the compressible seal member being operable in use to define a seal against the magnetically attractive substrate. In yet another feature, the wear member has the form of a repeating shape for use in a mosaic of repeating shapes to extend width-wise and breadth-wise substantially continuously to cover the magnetically attractive substrate. In another feature the wear member is held to the substrate only by magnetic force.

In another feature, the body includes an array of the accommodations defined therein. A plurality of magnetic members is seated in a plurality of accommodations of the array of accommodations. The body has a partition matrix therewithin. The partition matrix maintains between integers of the plurality of magnetic members, at least one of (a) breadth-wise spacing; and (b) width-wise spacing. In a further additional feature, the peripheral wall has a wall thickness comparable to the spacing between the integers of the plurality of magnetic members. In another further additional feature, the body is more flexible than each integer of the plurality of magnetic members whereby the body permits a measure of flexure between adjacent integers of the plurality of magnetic members.

In another aspect of the invention there is the combination of a trough structure that includes has a magnetically attractive substrate mentioned above, and a plurality of wear members as mentioned above, whether including or not including various ones of the other, additional, or further features above numerated. The integers of the plurality of wear members is laid side-by-side across and along the trough structure to define a wear liner pad array positioned to protect the magnetically attractive substrate from workflow materials passing along the trough structure. In another feature the wear members are retained in the trough structure and are free of mechanical fastenings. In a still further feature, all of the magnetic members share a common orientation of polarity predominantly normal to the second portion.

In another aspect of the invention there is a wear pad member for use as one integer of an array of wear pads for lining a trough structure, the trough structure including magnetically attractive material. The wear pad has a plurality of magnetic members; and a body, the body having a first portion, a second portion and a third portion. The third portion of the body has accommodations therein for each magnetic member of the plurality of magnetic members. The first portion overlies the third portion, the first portion being made of a consumable polymeric wear material. The second portion underlies the third portion. The second portion is magnetically transparent. The second portion establishes a stand-off distance between each magnetic member and the trough structure. The first and second portions have respective thicknesses. The thickness of the first portion is greater than the thickness of the second portion.

In another feature of that aspect of the invention the wear pad member is one in which any one of: (a) the first, second, and third portions are made of rubber based material and are cured into a single rubber monolith; and (b) the body is made at least predominantly of molded polymeric material and the plurality of magnetic members is cast within the molded polymeric material. In a further feature the magnetic members of the plurality of magnetic members are encapsulated within the body; and the body includes internal spacers positioned to separate adjacent integers of the magnetic members side-by-side. In still another feature, all of the magnetic members have substantially the same polar orientation predominantly normal to the second portion.

In another aspect of the invention there is a magnetically attractive trough structure and a plurality of wear pads as described above, which may include the other, additional or further features hereinabove enumerated, the wear pads being mounted in a cross-wise and lengthwise tile array to protect the trough structure.

In still another aspect of the invention there is a method of protecting a structure made of a magnetically attractive material. The method includes providing a plurality of magnetically attractive wear pad members in any of the variations noted above, those wear pad members being for use as integers of an array of wear pads; and laying the wear pads side-by-side in a tile pattern on a surface of the structure. In a feature of that aspect of the invention the structure is a trough.

In a further feature of that method, the method includes removing a pre-existing steel wear liner prior to laying the wear pads in the trough. In still another feature, the trough includes apertures for mechanical fasteners for attaching the pre-existing steel wear liner, and the method includes at least one of: (a) welding the apertures closed; and (b) positioning the wear pads to cover locations of the apertures.

In still another aspect of the invention there is a method of making a magnetic wear pad for use in a magnetically attractive trough structure. The method includes placing a thin layer of magnetically transparent polymeric material in a mold against a first mold surface; locating a plurality of magnetic members in the mold in spaced apart positions; filling the mold with a balance of polymeric material overlying the magnetic members, that balance of material including a layer of polymeric material thicker than the thin layer; and curing the material.

In a further feature of that method, the polymeric material of the thin layer and of the balance is a rubber based material, and the method includes vulcanizing the rubber based material hermetically to seal the magnetic members hermetically therewithin.

BRIEF DESCRIPTION OF THE DRAWINGS

These and other aspects of the invention may be more readily understood with the aid of the illustrative Figures included herein below, showing of an example, or examples, embodying the various aspects of the invention, provided by way of illustration, but not of limitation of the present invention, and in which:

FIG. 1b is a half cross-section of the trough of FIG. 1a;

FIG. 1d is a partially sectioned agitation tank showing another application of wear pads in an alternate embodiment to that of FIG. 1a;

FIG. 2a is a perspective view of a wear pad of the array of FIG. 1a;

FIG. 2b is a top view of the wear pad of FIG. 2a;

FIG. 2c is a side view of the wear pad of FIG. 2a;

FIG. 2d is a vertical section of the wear pad of FIG. 2b on '2d-2d';

FIG. 2e is an horizontal section of the wear pad of FIG. 2c on '2e-2e' with magnetic materials not installed;

FIG. 3a is a perspective view of an alternate wear pad to that of FIG. 2a;

FIG. 4b is a section similar to FIG. 2d of the wear pad of FIG. 4a.

DETAILED DESCRIPTION

Figure 1A:
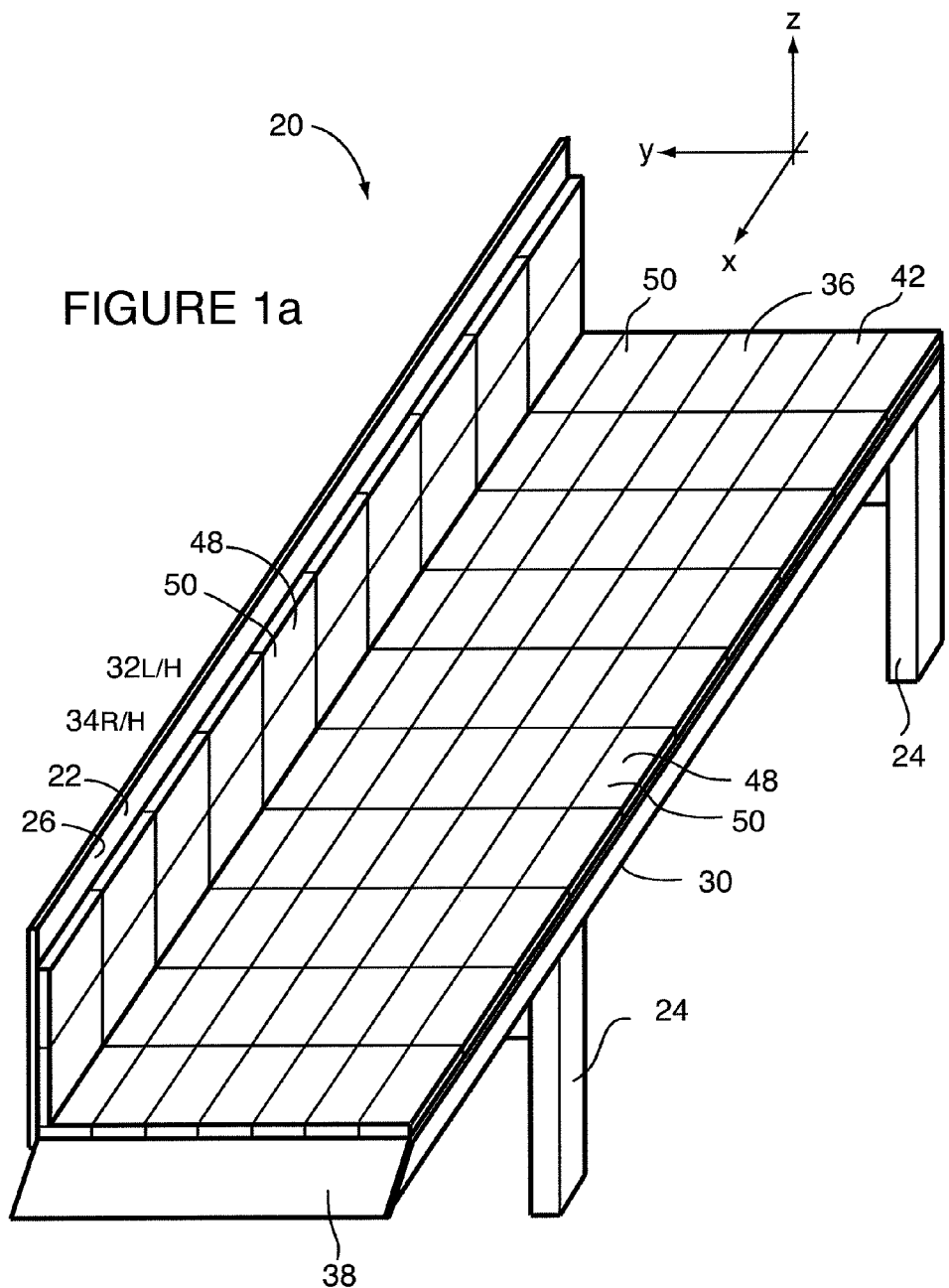
FIG. 1a is a general arrangement view of a trough having an array of wear pads mounted therein according to an aspect of the invention, the near side wall of the trough being omitted for clarity.
Figure 1B:
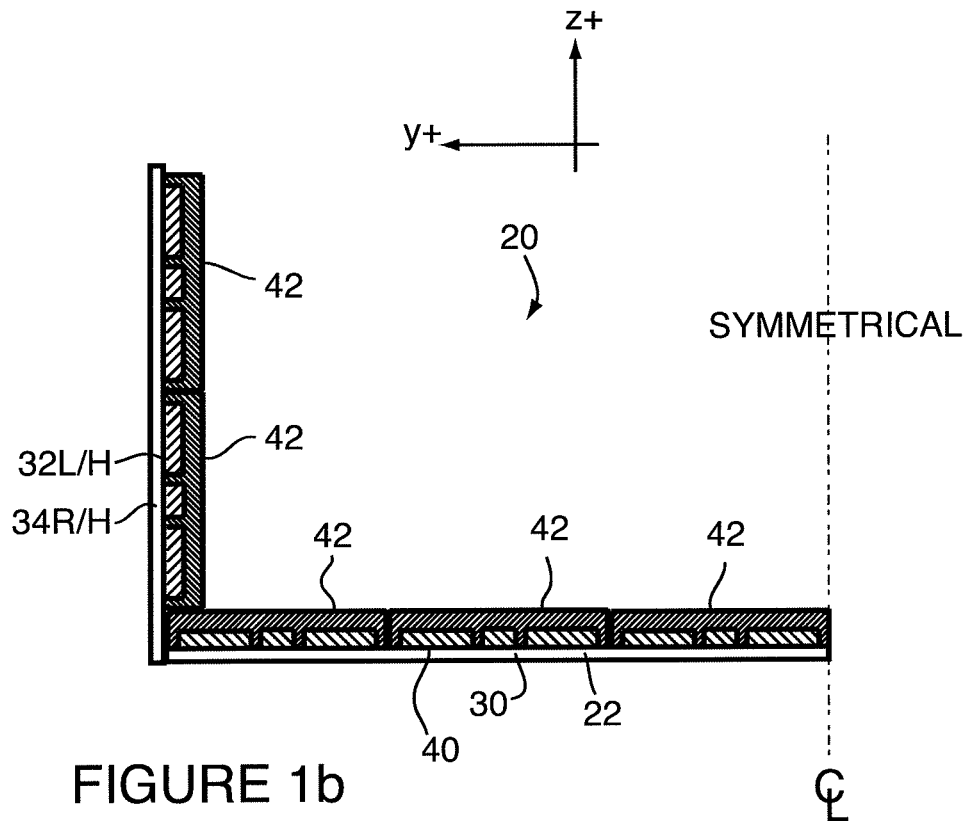

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are substantially to scale, except where noted otherwise, such as in those instances in which proportions may have been exaggerated in order more clearly to depict certain features of the invention.

Following from *Phillips* v. *AWH Corp.*, definitions provided in the specification are intended to supplant any dictionary definition, and to prevent interpretation in the US Patent Office (or in any other Patent Office) that strays from the customary and ordinary meaning of the terms provided herein.

To commence, FIG. 1a is a general arrangement view of a trough having an array of wear pads mounted therein, indicated generally as 20. The trough or chute, or duct, or flume, or sluice, or channel, however it may be called, has a structure 22, which may include supports 24 and a wall structure 26 that may include a base wall, or back, or bottom panel 30, and left and right hand side panels, 32, 34.

Generally speaking, trough 20 is intended to be a transport conduit for some kind of workflow. The workflow may tend to be particulate, and may tend to be abrasive. For example, the workflow may be crushed aggregate, be it sand, gravel, or crushed rock ore, whether in a continuous unsorted stream or sorted according to a maximum (or minimum, or both) grid size as through a series of sizing screens. The stream of material may be a metallic or other ore, or may be coal. Likewise it may be plastic pellet stock, or grain, or some other particulate material. It may be a material feedstock flow of foodstuffs, such as carrots, turnips, potatoes, or such like.

Typically, if not universally, trough 20 may be inclined, such that the force of gravity may tend to urge the workflow material along trough 20 from an inlet end 36 to an outlet end 38, inlet end 36 being elevated relative to outlet end 38. The illustration provided should not be taken as necessarily being proportionate in the length direction. The length may be very short, a few feet perhaps, or may be very long, several hundred or thousand feet long, depending on the application. For the purposes of description, the length direction may be considered to be potentially infinitely long as compared to the width direction. In respect of trough 20, the flow direction may be defined as being the longitudinal or axial or x-direction of the trough. The cross-wise or transverse direction may be defined as the y-direction, and the through thickness direction may be defined as the z-direction. For the purposes of this description the width-wise direction follows the arc of the surface of the trough. I.e., the through thickness is normal to the trough wall, whatever the orientation of the particular portion of the trough wall may be.

Typically, also, the workflow material may have the form of a slurry in which the solid particulate may be aided in its travel by a fluid transport medium, whether it be a liquid, such as water or oil, or a gas such as might involve a fluidized bed. Without departing from the generality of the foregoing, for the purposes of ease of conceptual understanding the workflow may be taken as being a waterborne or water-assisted flow of a crushed rock ore.

Also, typically, the trough may define a flow channel of constant cross-section. This need not necessarily be the case. The trough may taper somewhat like a funnel, or diverge like a diffuser, as may be appropriate to the process in question.

Figure 1C:
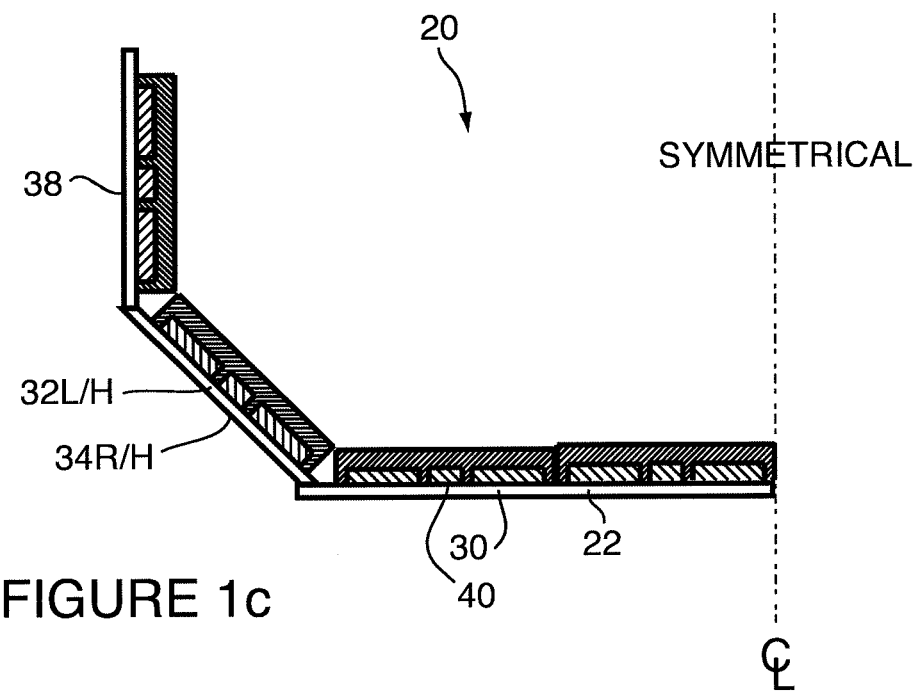
FIG. 1c is a half-cross-section of an alternate trough to that of FIG. 1b.

The flanks or side panels 32, 34 of trough 20, seen in cross-section, may be angled at 90 degrees to the main or back or bottom panel as in FIG. 1a, though this need not be so. Side panels 32, 34 could be angled at some greater included angle, be it 105 degrees, 120 degrees, 135 (as in FIG. 1c) degrees or 150 degrees, or such other angle as may be suitable for the process in question, such that trough 20 is narrower at bottom panel 30 than at the distal or upper margins of side panels 32, 34. It may also be that trough 20 is made of more than three panels, including additional wall panels or segments 38, as suggested in FIG. 1c, and it may be that trough 20 is not made of distinct panels, but rather of a continuously bent surface, whether that surface is a circular arc or some other arc or combination of arcs or arcs and tangent portions of the same or different radii of curvature. It is also typical that trough 20 is straight in the longitudinal or x-direction, though in the most general case this need not be so. I.e., trough 20 could be curved, or could have corners in the path direction. However, for the simplicity of discussion, it will be taken that trough 20 is straight in the longitudinal direction.

In each case, however, the containing or base structure 22 of the trough presents an inner surface 40 that is suitable for lining with an array 42 of tiles 48, namely the wear resistant assemblies or pads 50 described herein. Pads 50 each have a breadth $b_{50}$, a width $w_{50}$, and a through thickness $t_{50}$. The width and breadth extending in width-wise and breadthwise directions that, as installed run lengthwise and cross-wise with respect to the surface of the trough, whereas the thickness is generally normal to the trough surface.

Although the present description is cast predominantly in the context of wear liner pads for troughs, more generically wear pad assemblies 50 may be used in a variety of applications in which a structural member is to be protected from damage by, for example, abrasive objects or impact such as may occur when aggregate is dumped upon or against it. For example, wear pads 50 may be used to line a flat sorting table surface. That table surface may be neither tilted nor bounded by upstanding side retaining walls or fences, or it may have such incline, taper, sidewalls or guides, and so on, as may be appropriate. By way of another example, such pads may be used to line agitation tanks, such as tank 44 shown in partial section in FIG. 1d. In these instances, the square root of the planar or generally surface-wise breadth and width surface area may be taken as a dominant or characteristic dimension for comparison against through thickness, and in each case the square root of the area may tend to be at least three times the overall through-thickness of the pad, and perhaps in the range of 6 times, or more, than such through thickness.

Figure 3A:
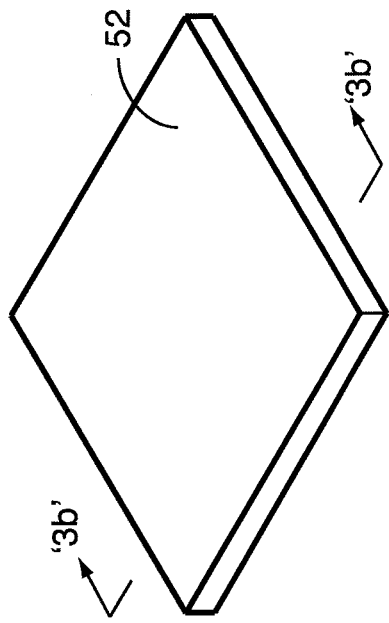
Figure 2B:
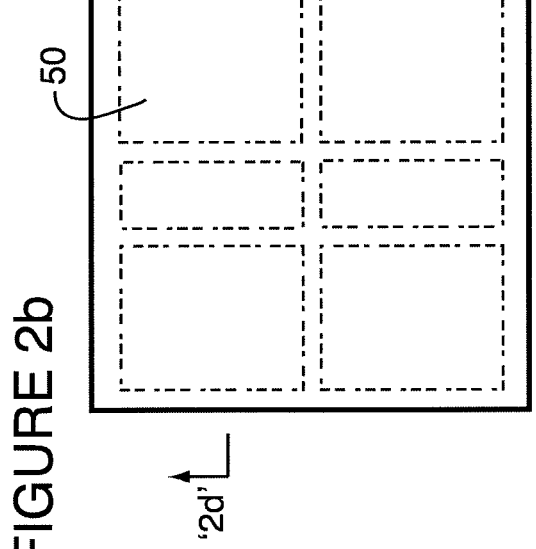
Figure 2C:
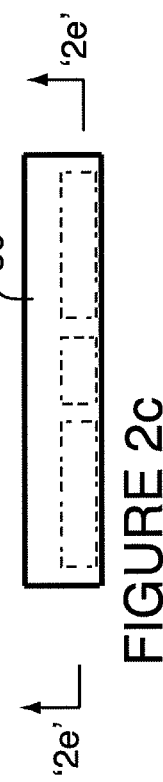
Figure 3B:
FIG. 3b is a sectional view of the wear pad of FIG. 3a taken on '3b-3b'.
Figure 4A:
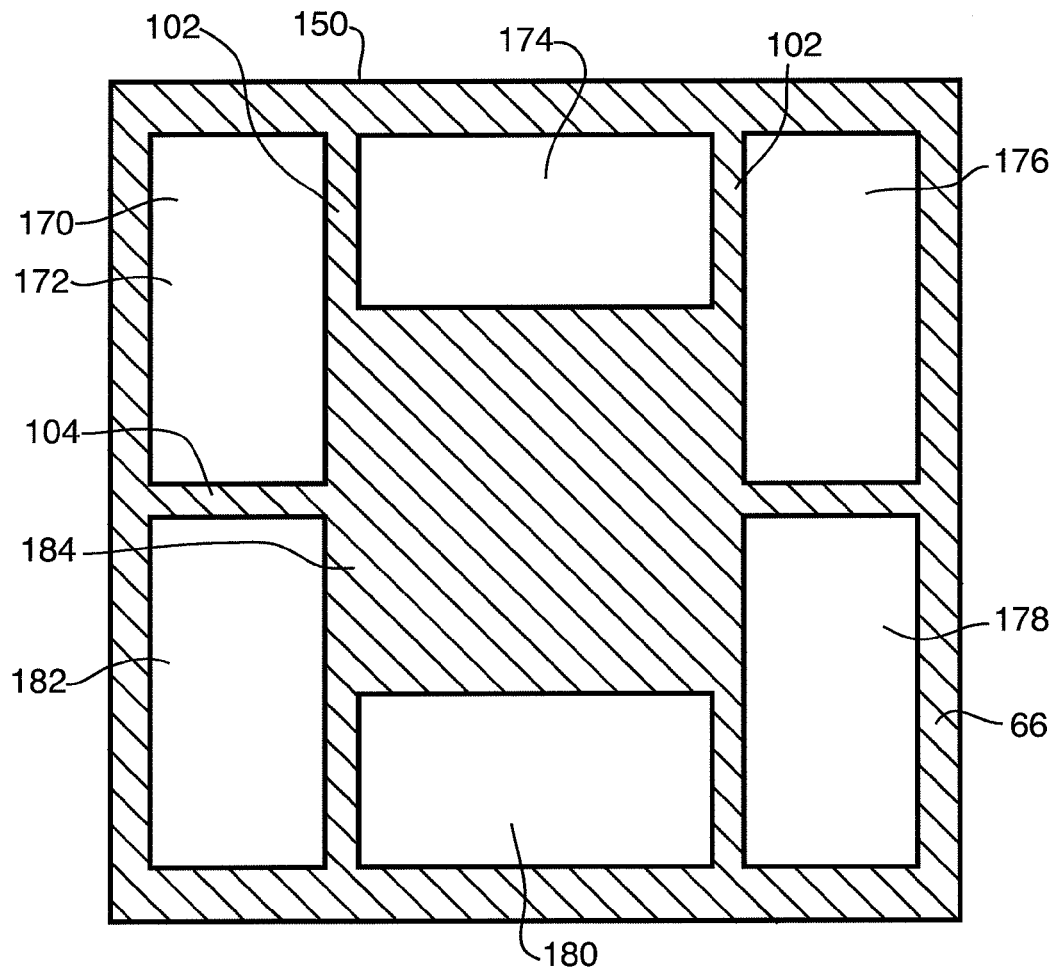
FIG. 4a is a cross-sectional view similar to FIG. 2e of an alternate wear pad to that of FIG. 2a, again with out magnetic members.
Figure 4B:
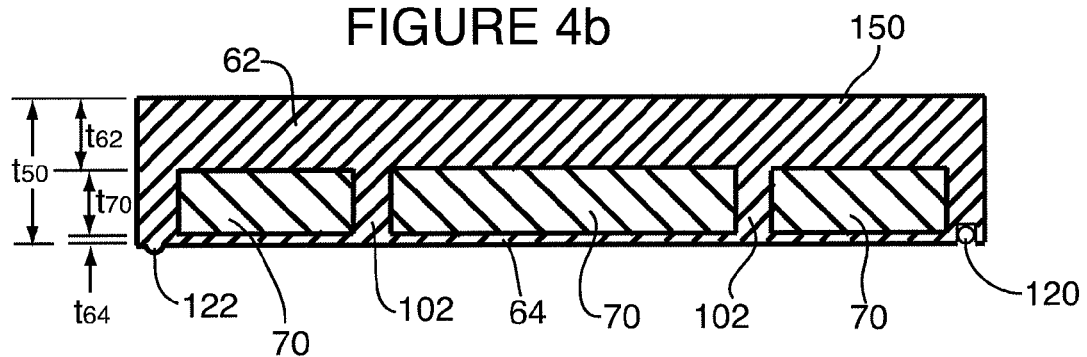

Each tile 48 of array 42, namely each wear liner pad assembly 50, may have breadth and width dimensions substantially greater than the through-thickness dimension, such that their characterization as being predominantly, or approximating substantially, planar (or predominantly trough surface-wise) extending tiles or plates is appropriate. It will be understood that more generically, a wear pad 50 need not be of a shape that would necessarily be reasonably characterised as a "tile". In most instances the breadth and width may be taken as being very substantially greater than the through-thickness, but in any case may be more than about two and a half or three times the overall through-thickness. More typically, it may be in the range of 4 to 10 times the through-thickness. Pads of different aspect ratios may be made, as suggested by thinner pad assembly 52 in FIGS. 3a and 3b.

While tiles 48 may tend to be substantially planar, this need not be so. Where the inside surface of trough 20 is curved, the tiles may be formed in such manner as may be appropriate for following that curve. An example of such a curved tile is pad assembly 46 of tank 44, which is formed on a portion of a cylindrical arc to mate with the cylindrical containment wall of tank 44 of FIG. 1d. Further, as explained below, tiles 48, i.e., pad assemblies 50, may each have an ability to flex to an extent that may facilitate accommodation of an underlying curved embodiment of surface 40 that may tolerate or accommodate local defects or asperities in underlying trough structure 22. Without departing from the generality of this description, from this point for ease of conceptual understanding the description shall proceed on the basis of pad assemblies 50 as approximating flat and planar tiles.

Each of tiles 48 has an outer peripheral shape when viewed on a projection normal to the plane of breadth-wise (or transverse) and depth-wise (or longitudinal) extent. It may be that a plurality of tiles of one shape, and only one shape, may be employed. Alternatively, there may be a pattern of tiles of two or more different shapes (e.g., octagons and squares; hexagons and diamonds; hexagons and triangles, and so on, there being many possibilities) that may be used to form a mosaic or repeating pattern of wear plates. The shape of each tile 48 does not need to be a regular polygon. It may, for example, be to some extent arbitrary, and may be interlocking. The shape of the pad may be circular as pad assembly 54 in FIG. 1d, or part of a pie shaped, or truncated pie-shaped sector as pad assemblies 56 and 58 also in FIG. 1d. However, and without limiting the generality of the foregoing, it may tend to be convenient for all of the pads to be of one regular shape. That shape could be a regular hexagon, but it is still more convenient that the shape be a quadrilateral having right-angled corners, whether a rectangle or a square, though most conveniently a square, such that a person installing the tiles need not be concerned with which direction is lengthwise, and which direction is cross-wise. This may tend to result in a tile having six faces, namely a bottom, a top, left hand, right hand, front (i.e., upstream) and rear (i.e., downstream). In the case of a square tile, left, right, front and rear may be arbitrary.

The structural members of trough 20 may tend to be made of a magnetically attractive material, such as mild steel. In the most general case, it may be that this magnetically attractive material of trough 20 is itself made of magnetic material or of material upon which a magnetic field is imposed externally, as by magnetising the material of making it part of an electromagnetic circuit; or, alternatively it may be a material that can be attracted to a magnet, such as a ferromagnetic material which may be pure iron or some alloy of iron, whether including nickel or chrome or some other alloying element. It may also be that the walls of the trough are made of magnetically transparent material backed by magnetically attractive material. Without departing from the generality of the foregoing, the material of trough 20 may most commonly be thought of as an un-magnetized mild steel. In some industries, such as a food processing industry, or in a coloured-plastic pellet application in which colour contamination is to be avoided, for example, the material may be a grade of stainless steel.

Pad assembly 50 may be employed in either a new trough, or as a replacement lining member for an existing trough. To the extent that pads 50 may be used for retrofit, trough 20 may previously have been lined with different wear liner materials, such as high hardness steel plate. It may be noted that in the past these steel wear liner plates have tended to be large, and therefore heavy, and have tended to require replacement of the entire wear liner even where only a portion, such as a central portion, of the wear liner has worn out. Inasmuch as wear liners have tended to have been made of abnormally hard steels, this replacement may have been relatively expensive.

Previous wear liner materials may have been held in place by, for example, threaded studs mounted to protrude from the backside, or bottom, thereof. The structure of the trough may have had corresponding apertures formed therein to permit those studs to protrude, thereby providing an element for securement with a corresponding threaded nut, washer, and lock washer.

Chutes or channels, or tables, or tanks, of this nature tend to be employed in high vibration or repetitive shock loading contexts. A common challenge with existing wear liners that are bolted to the underlying structure employing threaded studs is the tendency of those stud connections to loosen, or to fret, and, eventually, to leak. Where the flow material is wet, or is carried along by water, the tendency of the trough to leak at fastening points may generally be undesirable. Of course, anti-vibration nuts with nylon inserts, or wired crenelated nuts, may also have been used. However fastenings of this nature may have a tendency to work loose, to be corrosion initiation sites and so on. While fastener apertures may be welded closed subsequently with plug welds to fill those holes (and ground flush), it may also be that the holes remain without being filled.

Pad assembly 50 has a body, 60, that has the shape of a tile 48 as previously discussed. Body 60 includes a first layer or first portion 62, a second layer or second portion 64, and a peripheral wall 66. Peripheral wall 66, and hence more generally body 60, has a cavity, or internal space, or void, or chamber, such as may be designated as a first accommodation 68 defined therewithin. A magnetic member 70 is seated within this accommodation. Adopting the frame of reference of the trough or channel structure, if the bottom of the channel is considered to be underneath pad 50, then first layer or first portion 62 may be considered to be a layer that overlies accommodation 68 and magnetic member 70, second layer or second portion 64 underlies accommodation 68 and magnetic member 70. The third portion, being that of peripheral wall 66, is then sandwiched between first portion 62 and second portion 64.

Figure 2A:
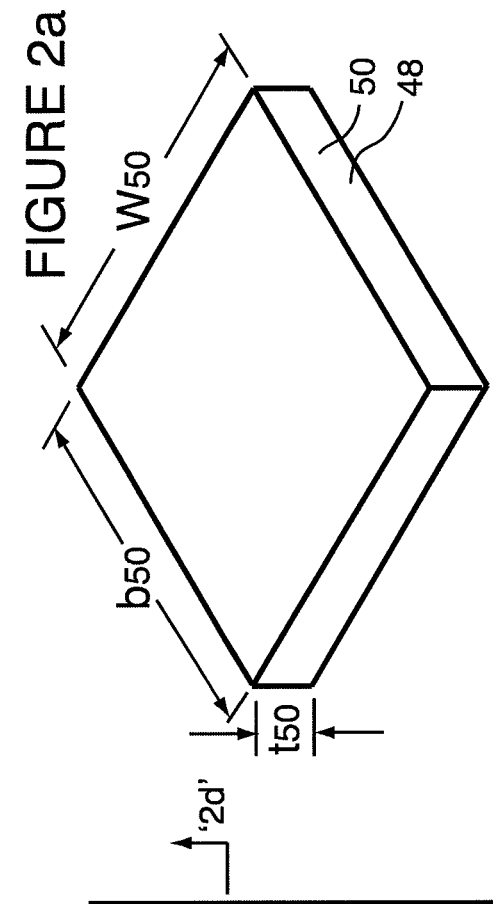

Pad assembly 50 may have a plurality of accommodations 68, and a plurality of magnetic members 70. Typically, though not necessarily, the number of magnetic members 70 may be equal to the number of accommodations 68, although it may be less. To the extent that there is a plurality of accommodations 68, those accommodations may be identified as 72, 74, 76, 78, 80 and 82, as shown in FIG. 2e. It is not necessary that these accommodations be of the same size, or of the same shape, or that they be rectangular. However, it may be convenient that they be four-sided polygons with right angled corners, e.g., rectangular as shown. The various magnetic members need not necessarily be the same size and shape as the accommodations into which they seat, but, again, it may be convenient that this be so, and that the magnets fit snuggly in place. The associated magnetic members may be indicated as 84, 86, 88, 90, 92 and 94. These accommodations may be separated by spacers, indicated generically as separators or spacers 96. Spacers 96 may have the form of standoffs, which may themselves be partitions 98, and which may include one or more breadth-wise partitions 100, and one of more depth-wise partitions 102. All of these partitions 98 taken together, however few or many there may be, may be termed a spider or a matrix, be it a separator matrix, or a partition matrix 104. It is not necessary that any of partitions 98, or any portion of matrix 104 be formed as part of, or even be in contact with peripheral wall 66. However, it may be convenient that they be formed as a single monolithic, integrally formed member.

The use of multiple chambers, and multiple magnetic members 70 may permit pad assembly 50 to flex to an extent that it might not otherwise be able to do to conform to, or seat upon the underlying chute or trough structure. In the case of a reconditioned trough, it may thereby facilitate formation of a seal against the trough structure by the footprint of the pad assembly, as may discourage leaking. Further, by accommodating a measure of flexing, the matrix may tend to prevent or to reduce the tendency toward cracking of the magnetic members.

Magnetic members 70 may be made of a magnetic material, be it a magnetized ferromagnetic or nickel material, be it a rare earth magnet material, or be it a ceramic or ceramic composite magnetic material. Many such materials are known. In terms of physical properties the magnetic material may have a density of the order of 7850 kg/m$^3$ (or 0.283 lb/cu. in.), and a Young's modulus of 30,000,000 psi. This is very much higher than the materials of which body 60 may be made, which may have densities in the order of 900-1100 kg/m$^3$ (0.04 lb/cu. in) and Young's moduli of the order of 1500-15 000 psi for rubber, or 300,000-500,000 psi for nylon, for example. As such the density of the magnetic materials is very much higher (roughly an order of magnitude, i.e., approaching 10 times, or perhaps somewhat more than ten times, greater), and the flexibility of those materials is very much less than (two or three orders of magnitude or more, i.e., of the order of a hundred or a thousand, or more, times, less than), the materials of body 62 in which they are encased. Thus, in this specification, body 62 is flexible as compared to the materials metallic or metallic-composite materials of magnetic members 70, such that if twisted or pressed, body 62 may stretch or twist or deform rather than magnetic members 70, and the term "flexible" may be understood in that context, and of which a non-limiting example is the relative flexibility of car or truck tires, or solid fork-lift tires to, those magnetic materials.

Magnetic members 70 need not themselves necessarily be magnetized. That is, magnetic members 70 and the underlying trough structure are magnetically attracted. One or the other, or both, are magnetic in use. Typically magnetic members 70 are magnetic. However, it is possible that the trough structure itself may be magnetized, or may include magnetized members, and it is sufficient that members 70 merely be made of a magnetically attractive material, susceptible to magnetic attraction.

Where magnetic member 70 is magnetized, one pole of magnetic member 70 faces toward first portion 62, and the other pole faces toward second portion 64. It does not matter which pole, North or South faces toward or away from trough structure 22 provided that all of magnetic members 70 face in the same direction.

The lateral spacing of magnetic members 70 from each other is desirable to the extent that they may be mutually repulsive. If adjacent magnetic members 70 are placed too close together, their mutual repulsion may tend to cause unwanted out-of-plane deflection in pad assembly 50. As such the thickness of the elements of matrix 104 may be of roughly the same magnitude as the sideways through-thickness of peripheral wall 66, which may, for example, be of the order of 1-2 cm, (⅜-¾ inch) or thereabout.

First portion 62 may be made of a first material. In contrast to previous metal wear plates, first portion 62 may have a non-metallic surface and body. That material may be a rubber or synthetic rubber based material, or may be a UHMW material, or a nylon or a polypropylene, or other material such as may, in some embodiments, be suitable for use in food processing applications. In the case of rubber or other materials it may include one or more layers of an embedded woven fabric. It is intended that the material of first portion 62 be substantially more flexible than the magnetic materials 70. It is also intended that the first material be a consumable material that may be worn away over time. In the example of a consumable material for use in transporting rock ores, the material may approximate the hard-rubber texture and flexibility of a truck or car tire. That is, the hardness of the material, and its elasticity, may fall in generally the same ranges as that for automotive or solid rubber tires, corresponding to perhaps 30-100 Shore A hardness, or 7-50 Shore D hardness. The type of material to be used, and the level of suitable elasticity and hardness may vary from application to application. In any case, the hardness and elasticity of first portion 62 are substantially different from that of magnetic members 70. The elasticity may be suitable for absorbing impact energy, to some extent. The first material of first portion 62 may be magnetically non-participating, or magnetically transparent. The through thickness $t_{62}$ of first portion 62 may depend on the application.

Second portion 64 may be made from a second material. That second material may be a rubber or synthetic rubber, or rubber based material, or may be an UHMW material, or a nylon, or a polypropylene or polyurethane, depending on the application. Again, if the application is a food processing application, or one in which chemical contamination is to be avoided, the material of second portion 64 may be selected accordingly. The second material is intended to be magnetically transparent, i.e., it is non-participating in a magnetic sense. The second material may also tend to be flexible, and may be compressible, as may be suitable for forming a seal against the underlying trough structure material such as may tend to discourage the leakage of water or other liquids through un-blocked fastener apertures or fittings such as may remain in the underlying structure. The types of materials, and ranges of elasticity and Young's modulus discuss above or in the context of the first material may also apply to the second material. The through thickness $t_{64}$ of second portion 64 may be chosen to maintain a roughly constant stand-off distance between an adjacent panel of trough 20 and magnetic members 70, and to maintain magnetic members 70 (or at least the flat or contoured bottom surfaces thereof) in a substantially parallel orientation relative to surface 40 of bottom panel 30 in use.

The third portion, namely peripheral wall 66, may likewise be made of any of the materials suitable for the first or second materials. It may be that the first, second and third materials are all the same material, or substantially the same material, although they need not necessarily be.

The through thicknesses of the various members differ, such that while the assembly may have a measure of symmetry in the x and y directions when viewed from above, the assembly does not have symmetry in the z direction (i.e., above and below any plane to which the z-axis is normal). The through thickness $t_{62}$ of first portion 62 may be of a roughly comparable general magnitude as the through thickness of magnetic members 70, whereas the through-thickness of second portion 64 may be very much less, and may be expected to be an order of magnitude less than the thickness of magnetic member 70 (and, therefore also an order of magnitude less than $t_{62}$). For example, depending on the application, the through thickness of magnetic members 70 may be in the range of perhaps as little as ⅜ inches (1 cm), or even ¾" in some embodiments such as light or lighter duty embodiments, to perhaps as much as 2" (5 cm). Common sizes might be approximately half an inch thick and approximately an inch thick. First portion 62 may have a suitable corresponding thickness, be it ½" inch thick, ¾" thick, an inch thick 1½ inches or 2 inches thick, or possibly thicker. Again the thickness may vary according to the application and the material used in that application. In any case ½ and 1 inch thicknesses might be typical thicknesses used for either magnetic member 70 or first portion 62, and it might not be atypical for magnetic member 70 and first portion 62 to be of roughly the same or similar thickness such that a ratio of $t_{62}:t_{70}$ might typically lie in the range of 2/5 to 5/2, and might be about 1:1.

By contrast, second portion 64 may be substantially thinner than either first portion 62 or magnetic members 70. For example, second portion 64 may be ⅛" thickness, or 1/16" in thickness, or less. In one embodiment it may be about 1/32" thickness, and so therefore an order of magnitude less than the thickness of either magnetic members 70 or first portion 62. The optimum thickness may vary from application to application. In each case however, the thicker side of the encapsulating casing is the side that faces toward the workflow of material, and the thinner side faces toward trough structure 22.

The context and use of pad assembly 50 may be understood in terms of overall size and weight. While it may be as small as 3"×3"×1", it may typically have a total size in the order of 8"×8" to 30-36"×30-36" in surface area by perhaps ¾ to an inch to 2-2½ inches or even 3 inches in thickness, giving a weight between about 20 lbs (approx 10 kg) and 100 Lbs (about 50 kg), tending to be closer to 50 lbs, or less such that they are portable by a single person, and may be installed or removed by a single person. For larger, heavier assemblies beyond about 100 lbs, installation and removal may be by machine. One size may be about 12"×12"×2" overall and 20-30 lbs. Pad assemblies 50 are of substantial size, and are intended for industrial use. They are large enough to cover a significant area, but may tend not to be so large or heavy as to prevent installation and removal by hand. Larger assemblies may be installed by, or with the aid of, machinery.

Pad assembly 50 may be manufactured in a mold. Second portion 64 may be laid in the mold first, against a flat bottom panel of the mold. This may tend to maintain second portion 64 flat (or, more generically, conforming to the desired surface contour of the bottom panel of the mold, which may in some, or many, embodiments be flat). Peripheral wall 66 may be placed in the mold, as may separator matrix 104. The various magnetic members 70 may be placed in their associated accommodations. First portion 62 may then be placed in the mold, and the mold may be closed. To the extent that each of first portion 62, second portion 64 and peripheral wall 66 is in the form of a "green", or uncured, polymeric material, such as uncured rubber. The material may then be heated and cured in the mold, at which time the material of the various portions may fuse or cross-link, or vulcanize in the case of rubber based materials. The resulting assembly includes encapsulated magnetic material, with the cured polymer then constituting an encapsulant. In the normal course the magnetic materials may be fully surrounded by, and hermetically sealed within, the encapsulant. This need not necessarily be the case. Second portion 64 may have the form of a grid or matrix or grating, or perforated panel or skin that, nonetheless, functions as a standoff to maintain the appropriate spacing distance of magnetic members 70 from the underlying trough panel, be it 30, 32 or 34.

Alternatively, after placing second portion 64 in the mold, and after positioning magnetic members 70 in the mold in the manner of cores or inserts, the remaining material of body 22 may be injection moulded. In a further alternative, the various components may be assembled and attached with suitable bonding agents. Typically pad assembly 50 may be entirely black in colour, and to the extent that the predominant material is rubber or rubber based, carbon black may be added. The use of a polymer, such as rubber, in this application may also tend to provide a damping, or absorbing effect both with respect to physical impact and with respect to noise. That is, the materials of pad assembly 50 noted above may each tend to have high anelasticity as compared to metals such as the steel wear plates previously used—they are sound deadeners, not amplifiers.

Typically, in use the magnetic material may become visible when the pad is worn through, or an operator may make periodic measurements with a gauge to determine the extent of wear and whether replacement is required. In alternate embodiments, pad assembly 50 may include a wear indicator encapsulated within the assembly, whether a layer or material plugs of a different (i.e., bright and contrasting) colour or some other means.

In a further alternate embodiment, the underside of second portion 62 may have a groove or seat formed therein to accommodate one or more compressible O-rings 120. The groove may extend about the peripheral margins of second portion 62, and the O-ring seated therein may define a footprint, such as might otherwise be defined by the contact area of the surface of second portion 62 bearing against the underlying structure. The compression of the seal may then determine the stand-off distance. Alternatively, a protruding bead 122 may extend peripherally about second portion 62, bead 122 being somewhat compressible to yield a seal. Where such a bead or O-ring, or the like, is employed to yield a seal, the larger, cross-wise and breadth-wise extending portions of second portion 62 may tend nonetheless to define a minimum standoff distance between magnetic member 70 and the underlying trough or other structure, whatever the compression of the seal or bead may be, and whatever the deflection of the peripheral margin of first portion 62 may be. The bead or seal need not be under, or only under, the peripheral margin of item 62. There could be more than one such bead or seal, and a separate bead or seal might be placed under each individual magnetic member, as may be.

In a still further alternate embodiment, a pad assembly 150 may be provided with an array of accommodations 170, being individually accommodations 172, 174, 176, 178, 180, and 182. As can be seen, these accommodations are arranged about the peripheral margin of pad assembly 150, the more central region 184 being left without magnetic elements. In using this peripheral array, the outside edge of pad assembly 150 is held in place.

In use, trough structure 22 is lined with an array of tiles such as pad members 50 as described. The tiles do not need to be perfectly tightly positioned against each other, although it may be desirable. To the extent that the workflow material may include "fines", those fine materials will, soon after installation, tend to fill any remaining interstitial cracks. The weight of pad assembly 50; the magnetic force between pad assembly 50 and trough structure 20; and the closely adjacent presence of other pad assemblies 50 preventing lateral movement or migration, may all tend to work to retain each pad 50 in its desired place. The magnetic force, alone, may tend to hold pad assembly 50 in place.

Over time, the impact of falling or bouncing workflow materials on the various tiles, and the passage of the workflow particulate over the tiles may tend to abrade and then wear away the sacrificial or consumable material of first portion 62. Subject to appropriate periodic monitoring, at some time the wear on at least some tiles will have reached the point where replacement is required. At that point maintenance workers with hand pries not unlike un-sharpened ¾" or 1" chisels, may progressively pry up and remove tiles, working inward from an edge (typically an uppermost edge) of array 40 toward those tiles to be removed. In other circumstances, pad assembly 50 may be removed, such as in an automated process, by the use of magnets developing a stronger magnetic force than that attracting pad assembly 50 to the underlying substrate, that stronger magnetic force possibly being that of an electromagnet on a removal tool or boom.

In contrast to previous monolithic hardened steel wear plates, only those of pad assemblies 50 that are worn need be replaced by exchanging them for new tiles. Furthermore, and alternatively, to the extent that a single size of tile is used, or a small number of sizes and shapes of tiles are used, it may be that worn tiles taken from near the longitudinal centerline of trough 20 may be exchanged with less-worn tiles from, for example, the upper edges of the flanks of trough 20 to promote more even wear prior to a need for replacement.

Pad assembly 50 may tend to provide an abrasion and impact resistant surface to industrial equipment. In the view of the inventor it is quite dissimilar from known alternatives. While there are products that use magnetic force to attract, for example, iron particles from an ore mix to yield an "iron" wear surface, these magnets are installed mechanically and their purpose is not to hold the wear members in place but rather to attract the iron particles. Various embodiments shown and described herein provide wear liners that "fasten" to the underlying structure using magnetic force alone. Those pads tend to remain in place under the influence of magnetic force while being subjected to impact and abrasion.

Figure 1D:
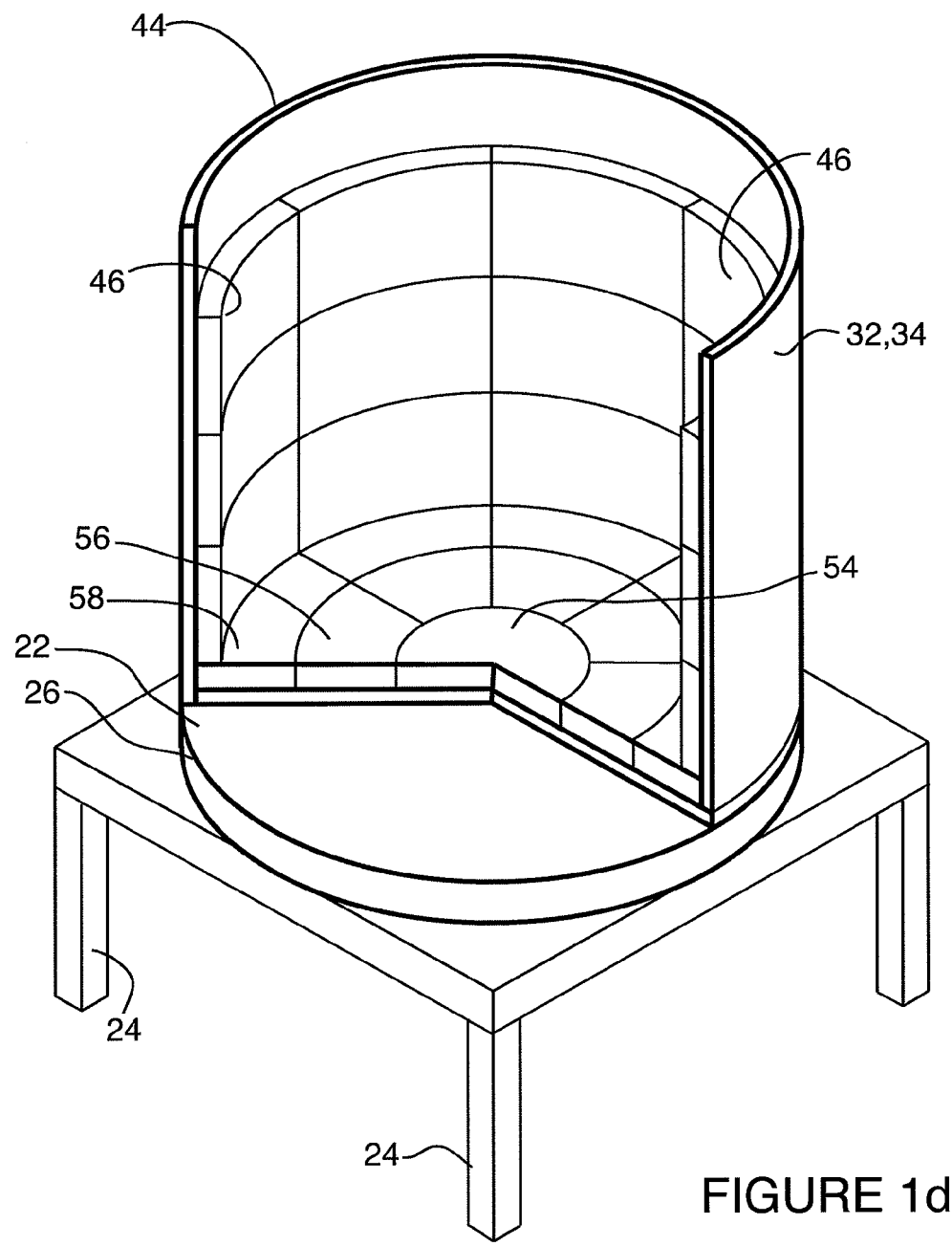

The embodiments above include embodiments in which the seating of the footprint of the wear pad may tend to create a water resistant seal on the face of the surface of the underlying equipment. The pads permit small areas of worn pads, or even a single worn pad, to be exchanged out without removing the whole lining, or substantially the whole lining. As illustrated in FIG. 1d, for example, the wear pads can be made to suit a variety of geometric requirements. As indicated, the pads may be made to a multitude of different thicknesses. The pads are not intended to, nor do they, rely on direct contact between the magnetic members and Underlying ferromagnetic materials, and they are not intended to be used, as "patches" for existing metal surfaces. Nor are the pad assemblies used as anchor fittings for holding other ferrous metal wear members in place. Rather, various embodiments illustrated and described herein are stand alone units.

Several embodiments of wear pad members have been described and illustrated. For brevity of description it may be understood that the features of those various embodiments may be "mixed and matched" in many different permutations and combinations, without each specific combination being described and illustrated individually herein.

The principles of the present invention are not limited to these specific examples, which are given by way of illustration. It is possible to make other embodiments that employ the principles of the invention and that fall within its spirit and scope of the invention. Since changes in and or additions to the above-described embodiments may be made without departing from the nature, spirit or scope of the invention, the invention is not to be limited to those details, but only by the appended claims.

What is claimed is:

1. A wear member comprising:
   a body having at least a first accommodation defined therein;
   said body having a width, a breadth and a thickness, each of said width and breadth being greater in magnitude than said thickness;
   at least a first magnetic member, said first magnetic member being seated in said first accommodation;
   said body having a first portion, a second portion, and a peripheral wall;
   said first portion being made of a first material;
   said first portion extending predominantly width-wise and breadth-wise, and overlying said first magnetic member;
   said second portion underlying said first magnetic member;
   said peripheral wall extending about said magnetic member;
   said first material being a non-magnetizable, non-brittle, consumable wear material;
   said first material having a first modulus of elasticity;
   said magnetic member including magnetic material, said magnetic material having a modulus of elasticity;
   said first modulus of elasticity of said first material being at least an order of magnitude smaller than said modulus of elasticity of said magnetic material of said first magnetic member;
   said second portion being magnetically transparent;
   said body defining a footprint of said wear member for seating on a magnetically attractive substrate, and, when in use, said second portion extends between said first magnetic member and the magnetically attractive substrate, and maintains a stand-off distance therebetween;
   said first magnetic member has a first magnetic pole and a second magnetic pole;
   said first magnetic pole is proximate to said second portion; and
   said second magnetic pole is distant from said second portion.

2. The wear member of claim 1 wherein, in use, said second portion defines a constant standoff-distance between all of said magnetic members and the magnetically attractive substrate.

3. The wear member of claim 1 wherein said first portion is substantially thicker than said second portion, and said second portion is substantially thinner than said first magnetic member.

4. The wear member of claim 1 wherein said first portion, said second portion and said first magnetic member, taken together, have an overall thickness, and at least one of:
   (a) said first portion is at least five times as thick as said second portion; and
   (b) said first portion is at least one third as thick as said overall thickness.

5. The wear member of claim 1 wherein at least one of:
   (a) said first portion is made of a polymeric material;
   (b) said second portion is made of a polymeric material; and
   (c) said first and second portions are made of the same polymeric material.

6. The wear member of claim 1 wherein said first magnetic member and any additional magnetic members are encapsulated within said body.

7. The wear member of claim 1 wherein said first portion, said second portion, and said peripheral wall form a unified assembly that is one of:
   (a) a monolithic polymer based casting;
   (b) a vulcanized rubber-based member;
   (c) an assembly of permanently fused polymeric members encapsulating said first magnetic member and any other magnetic member of said wear member.

8. The wear member of claim 1 wherein any one of:
   (a) said second portion is made of a polymeric material flexible to define, in use, a seal against the magnetically attractive substrate; and
   (b) said second portion has a compressible seal member mounted thereto, said compressible seal member being operable in use to define a seal against the magnetically attractive substrate.

9. The wear member of claim 1 wherein said wear member has the form of a repeating shape for use in a mosaic of repeating shapes to extend width-wise and breadth-wise substantially continuously to cover the magnetically attractive substrate.

10. The wear member of claim 1 wherein said body includes an array of said accommodations defined therein, and a plurality of magnetic members seated in a plurality of accommodations of said array of accommodations, and said body has a partition matrix therewithin, said partition matrix maintaining between integers of said plurality of magnetic members at least one of (a) breadth-wise spacing; and (b) width-wise spacing.

11. The wear member of claim 10 wherein said peripheral wall has a wall thickness comparable to said spacing between said integers of said plurality of magnetic members.

12. The wear member of claim 10 wherein said body is more flexible than each integer of said plurality of magnetic members whereby said body permits a measure of flexure between adjacent integers of said plurality of magnetic members.

13. The combination of a plurality of wear members according to claim 1, and a trough structure having a magnetically attractive substrate, said plurality of wear members being laid side-by-side across and along said trough structure to define a wear liner pad array positioned to protect said magnetically attractive substrate from workflow materials passing along said trough structure.

14. The combination of claim 13 wherein said wear members are retained in said trough structure and are free of mechanical fastenings.

15. The combination of claim 13 wherein said wear members are retained in said trough structure only by magnetic force.

16. The wear member of claim 10 wherein all of said magnetic members share a common orientation of polarity predominantly normal to said second portion.

17. A wear pad member for use as one integer of an array of wear pads for lining a trough structure, the trough structure including magnetically attractive material, wherein said wear pad comprises:
   a plurality of magnetic members;
   a body, said body having a first portion, a second portion and a third portion;
   said third portion having accommodations therein for each magnetic member of said plurality of magnetic members;

said first portion overlying said third portion, said first portion being made of a consumable polymeric wear material;

said second portion underlying said third portion, said second portion being magnetically transparent, said second portion establishing a stand-off distance between each said magnetic member and the trough structure; and said first and second portions having respective thicknesses, said thickness of said first portion being greater than said thickness of said second portion;

said plurality of magnetic members includes a first magnetic member, said first magnetic member having a first magnetic pole and a second magnetic pole;

said first magnetic pole is proximate to said second portion; and said second magnetic pole is distant from said second portion.

18. The wear pad member of claim 17 wherein any one of:
(a) said first, second, and third portions are made of rubber based material and are cured into a single rubber monolith; and
(b) said body is made at least predominantly of molded polymeric material and said plurality of magnetic members is cast within said molded polymeric material.

19. The wear pad member of claim 17, wherein:
said magnetic members of said plurality of magnetic members are encapsulated within said body; and
said body includes internal spacers positioned to separate adjacent integers of said magnetic members side-by-side.

20. The wear pad member of claim 19 wherein all of said magnetic members have substantially the same polar orientation predominantly normal to said second portion.

21. The combination of a magnetically attractive trough structure and a plurality of wear pads according to claim 19, said wear pads being mounted in a cross-wise and lengthwise tile array to protect said trough structure.

22. The wear member of claim 4 wherein said second portion is less than 1/20 as thick as said overall thickness; and each of said length and said breadth is more than 8 times as great as said overall thickness.

23. The wear member of claim 1 wherein: said first portion has a thickness, $t_1$; said magnet has a thickness $t_m$; and the ratio $t_1:t_m$, lies in the range of 2/5 to 5/2.

24. The wear member of claim 1 wherein said first portion has a hardness in the range of at least one of (a) 30-100 Shore A; and (b) 7-50 Shore D.

25. The wear member of claim 1 wherein said magnetic member is one of (a) 1/4" thick; and (b) greater than 1/4" thick.

26. The wear member of claim 1 wherein said first portion is one of (a) 1/2" thick; and (b) greater than 1/2" thick.

27. The wear member of claim 1 wherein:
said first portion has a thickness, $t_1$; said magnet has a thickness $t_m$; and the ratio $t_1:t_m$, lies in the range of 2/5 to 5/2; said first portion has a hardness in the range of at least one of (a) 30-100 Shore A; and (b) 7-50 Shore D;
said magnetic member is one of (a) 1/4" thick; and (b) greater than 1/4" thick; and
said first portion is one of (a) 1/2" thick; and (b) greater than 1/2" thick.

28. The wear member of claim 27 wherein said first portion, said second portion and said first magnetic member, taken together, have an overall thickness; said second portion is less than 1/20 as thick as said overall thickness; and each of said length and said breadth is more than 8 times as great as said overall thickness.

29. A wear member comprising:
a body having at least a first accommodation defined therein;
said body having a width, a breadth and a thickness, each of said width and breadth being greater in magnitude than said thickness;
at least a first magnetic member, said first magnetic member being seated in said first accommodation;
said body having a first portion, a second portion, and a peripheral wall;
said first portion being made of a first material;
said first portion extending predominantly width-wise and breadth-wise, and overlying said first magnetic member;
said second portion underlying said first magnetic member;
said peripheral wall extending about said magnetic member;
said first material being a non-magnetizable, non-brittle, consumable wear material;
said first material having a first modulus of elasticity;
said magnetic member including magnetic material, said magnetic material having a modulus of elasticity;
said first modulus of elasticity of said first material being at least an order of magnitude smaller than said modulus of elasticity of said magnetic material of said first magnetic member;
said second portion being magnetically transparent;
said body defining a footprint of said wear member for seating on a magnetically attractive substrate, and, when in use, said second portion extends between said first magnetic member and the magnetically attractive substrate, and maintains a stand-off distance therebetween; and
said first portion, said second portion, and said peripheral wall form a unified assembly that is one of:
(a) a monolithic polymer based casting;
(b) a vulcanized rubber-based member;
(c) an assembly of permanently fused polymeric members encapsulating said first magnetic member and any other magnetic member of said wear member.

30. The wear member of claim 29 wherein said first portion is substantially thicker than said second portion, and said second portion is substantially thinner than said first magnetic member, and, in use, said second portion defines a constant standoff-distance between all of said magnetic members and the magnetically attractive substrate.

31. The combination of:
a plurality of wear members and a trough structure having a magnetically attractive substrate;
said plurality of wear members being laid side-by-side across and along said trough structure to define a wear liner pad array positioned to protect said magnetically attractive substrate from workflow materials passing along said trough structure;
each wear member having a body having at least a first accommodation defined therein;
said body having a width, a breadth and a thickness, each of said width and breadth being greater in magnitude than said thickness;
at least a first magnetic member, said first magnetic member being seated in said first accommodation;
said body having a first portion, a second portion, and a peripheral wall;
said first portion being made of a first material;
said first portion extending predominantly width-wise and breadth-wise, and overlying said first magnetic member;

said second portion underlying said first magnetic member;

said peripheral wall extending about said magnetic member;

said first material being a non-magnetizable, non-brittle, consumable wear material;

said first material having a first modulus of elasticity;

said magnetic member including magnetic material, said magnetic material having a modulus of elasticity;

said first modulus of elasticity of said first material being at least an order of magnitude smaller than said modulus of elasticity of said magnetic material of said first magnetic member;

said second portion being magnetically transparent; and said body defining a footprint of said wear member for seating on a magnetically attractive substrate, and, when in use, said second portion extends between said first magnetic member and the magnetically attractive substrate, and maintains a stand-off distance therebetween.

32. The combination of claim 31 wherein said wear members are retained in said trough structure and are free of mechanical fastenings.

33. The combination of claim 32 wherein said wear members are retained in said trough structure only by magnetic force.

34. A wear pad member for use as one integer of an array of wear pads for lining a trough structure, the trough structure including magnetically attractive material, wherein said wear pad comprises:

a plurality of magnetic members;

a body, said body having a first portion, a second portion and a third portion;

said third portion having accommodations therein for each magnetic member of said plurality of magnetic members;

said first portion overlying said third portion, said first portion being made of a consumable polymeric wear material;

said second portion underlying said third portion, said second portion being magnetically transparent, said second portion establishing a stand-off distance between each said magnetic member and the trough structure;

said first and second portions having respective thicknesses, said thickness of said first portion being greater than said thickness of said second portion; and any one of:
(a) said first, second, and third portions are made of rubber based material and are cured into a single rubber monolith; and
(b) said body is made at least predominantly of molded polymeric material and said plurality of magnetic members is cast within said molded polymeric material.

35. The wear pad member of claim 34 wherein all of said magnetic members have substantially the same polar orientation predominantly normal to said second portion.

36. A wear member comprising:

a body having at least a first accommodation defined therein;

said body having a width, a breadth and a thickness, each of said width and breadth being greater in magnitude than said thickness;

at least a first magnetic member, said first magnetic member being seated in said first accommodation;

said body having a first portion, a second portion, and a peripheral wall;

said first portion being made of a first material;

said first portion extending predominantly width-wise and breadth-wise, and overlying said first magnetic member;

said second portion underlying said first magnetic member;

said peripheral wall extending about said magnetic member;

said first material being a non-magnetizable, non-brittle, consumable wear material;

said first material having a first modulus of elasticity;

said magnetic member including magnetic material, said magnetic material having a modulus of elasticity;

said first modulus of elasticity of said first material being at least an order of magnitude smaller than said modulus of elasticity of said magnetic material of said first magnetic member;

said second portion being magnetically transparent; and said body defining a footprint of said wear member for seating on a magnetically attractive substrate, and, when in use, said second portion extends between said first magnetic member and the magnetically attractive substrate, and maintains a stand-off distance therebetween; and said first portion has a hardness in the range of at least one of (a) 30-100 Shore A; and (b) 7-50 Shore D.

37. The wear member of claim 36 wherein said magnetic member is one of (a) ½" thick; and (b) greater than ¼" thick.

38. The wear member of claim 36 wherein said first portion is one of (a) ½" thick; and (b) greater than ½" thick.

39. The wear member of claim 36 wherein said first portion is substantially thicker than said second portion, and said second portion is substantially thinner than said first magnetic member, and, in use, said second portion defines a constant standoff-distance between all of said magnetic members and the magnetically attractive substrate.

40. The wear member of claim 36 wherein said body includes an array of said accommodations defined therein, and a plurality of magnetic members seated in a plurality of accommodations of said array of accommodations, and said body has a partition matrix therewithin, said partition matrix maintaining between integers of said plurality of magnetic members at least one of (a) breadth-wise spacing; and (b) width-wise spacing; and all of said magnetic members share a common orientation of polarity predominantly normal to said second portion.

41. The combination of a magnetically attractive trough structure and a plurality of wear members according to claim 36, said wear members being mounted in a cross-wise and lengthwise tile array to protect said trough structure.

42. A wear member comprising:

a body having at least a first accommodation defined therein;

said body having a width, a breadth and a thickness, each of said width and breadth being greater in magnitude than said thickness;

at least a first magnetic member, said first magnetic member being seated in said first accommodation;

said body having a first portion, a second portion, and a peripheral wall;

said first portion being made of a first material;

said first portion extending predominantly width-wise and breadth-wise, and overlying said first magnetic member;

said second portion underlying said first magnetic member;

said peripheral wall extending about said magnetic member;

said first material being a non-magnetizable, non-brittle, consumable wear material;
said first material having a first modulus of elasticity;
said magnetic member including magnetic material, said magnetic material having a modulus of elasticity;
said first modulus of elasticity of said first material being at least an order of magnitude smaller than said modulus of elasticity of said magnetic material of said first magnetic member;
said second portion being magnetically transparent; and
said body defining a footprint of said wear member for seating on a magnetically attractive substrate, and, when in use, said second portion extends between said first magnetic member and the magnetically attractive substrate, and maintains a stand-off distance therebetween; and any one of:
(a) said second portion is made of a polymeric material flexible to define, in use, a seal against the magnetically attractive substrate; and
(b) said second portion has a compressible seal member mounted thereto, said compressible seal member being operable in use to define a seal against the magnetically attractive substrate.

\* \* \* \* \*